(12) United States Patent
Liu et al.

(10) Patent No.: US 12,193,629 B2
(45) Date of Patent: Jan. 14, 2025

(54) VACUUM CLEANER

(71) Applicant: SKYBEST ELECTRIC APPLIANCE (SUZHOU) CO., LTD., Suzhou (CN)

(72) Inventors: Haiping Liu, Suzhou (CN); Zhao Kong, Suzhou (CN); Liang Xia, Suzhou (CN)

(73) Assignee: Skybest Electric Appliance (Suzhou) Co., Ltd., Suzhou (CN)

( * ) Notice: Subject to any disclaimer, the term of this patent is extended or adjusted under 35 U.S.C. 154(b) by 1620 days.

(21) Appl. No.: 16/465,279

(22) PCT Filed: Dec. 5, 2017

(86) PCT No.: PCT/CN2017/114537
§ 371 (c)(1),
(2) Date: Sep. 18, 2019

(87) PCT Pub. No.: WO2018/099489
PCT Pub. Date: Jun. 7, 2018

(65) Prior Publication Data
US 2023/0190058 A1 Jun. 22, 2023

(30) Foreign Application Priority Data

Dec. 1, 2016 (CN) .......................... 201611087795.X
Dec. 12, 2016 (CN) .......................... 201611139114.X
(Continued)

(51) Int. Cl.
*A47L 9/19* (2006.01)
*A47L 9/12* (2006.01)
(Continued)

(52) U.S. Cl.
CPC ................ *A47L 9/19* (2013.01); *A47L 9/127* (2013.01); *A47L 9/22* (2013.01); *B01D 46/0004* (2013.01);
(Continued)

(58) Field of Classification Search
CPC ...... A47L 9/10–1683; A47L 9/22; A47L 9/91; A47L 9/19; A47L 9/127; B01D 46/0004;
(Continued)

(56) References Cited

U.S. PATENT DOCUMENTS 4,538,971 A * 9/1985 Miller .................. A47L 7/0028
15/327.2
5,102,435 A 4/1992 Rau et al.
(Continued)

FOREIGN PATENT DOCUMENTS

CA 2193420 A1 * 2/1998
CN 204618100 U 9/2015
(Continued)

OTHER PUBLICATIONS

International Search Report for Application No. PCT/CN/2017/114537, dated Feb. 20, 2018.

*Primary Examiner* — Brian D Keller
*Assistant Examiner* — Sidney D Full
(74) *Attorney, Agent, or Firm* — JK Intellectual Property Law, PA (57) ABSTRACT

A vacuum cleaner, includes a dirty air inlet, a clean air outlet and an air channel arranged between the dirty air inlet and the clean air outlet. A vacuum generator is arranged inside the air channel. A first filter is arranged in the upper reach of the vacuum generator. A second filter is arranged in the upper reach of the first filter. The vacuum cleaner further comprises a state sensor. When in a second state, the first filter and the second filter are not combined, and the state
(Continued)

sensor is not triggered. Missing mounting prevention detection of a main filter and a pre-filter can be realised at the same time by means of a micro-control switch, thereby saving on cost.

16 Claims, 6 Drawing Sheets

(30) Foreign Application Priority Data

Dec. 12, 2016 (CN) .......................... 201611139122.4
Dec. 12, 2016 (CN) .......................... 201611139125.8
Dec. 12, 2016 (CN) .......................... 201611139671.1

(51) Int. Cl.
*A47L 9/22* (2006.01)
*B01D 46/00* (2022.01)
*B01D 46/24* (2006.01)
*B01D 46/64* (2022.01)

(52) U.S. Cl.
CPC ..... *B01D 46/0005* (2013.01); *B01D 46/0086* (2013.01); *B01D 46/2403* (2013.01); *B01D 46/64* (2022.01); *B01D 2265/029* (2013.01); *B01D 2279/55* (2013.01)

(58) Field of Classification Search
CPC ............ B01D 46/0086; B01D 46/2403; B01D 46/64; B01D 2279/55; B01D 46/004; B01D 2265/029
USPC ............ 55/467, 428; 15/327.1, 327.2, 327.6, 15/327.7, 339, 347, 412
See application file for complete search history.

(56) References Cited

U.S. PATENT DOCUMENTS

| | | | |
|---|---|---|---|
| 5,201,095 A | | 4/1993 | Choi |
| 5,855,634 A | * | 1/1999 | Berfield ................ A47L 7/0042 210/450 |
| 6,110,248 A | * | 8/2000 | Liu .................... B01D 46/2414 55/498 |
| 9,408,509 B2 | * | 8/2016 | Plato ...................... A47L 9/106 |
| 2017/0000305 A1 | * | 1/2017 | Gordon .................... A47L 5/30 |

FOREIGN PATENT DOCUMENTS

| | | |
|---|---|---|
| CN | 204909303 U | 12/2015 |
| CN | 106073638 A | 11/2016 |
| CN | 206534591 U | 10/2017 |

* cited by examiner

VACUUM CLEANER

CROSS-REFERENCE TO RELATED APPLICATIONS

This application is a national stage of International Application No. PCT/CN2017/114537, filed Dec. 5, 2017, and claims benefit to Chinese Patent Application Nos. 201611087795.X, filed Dec. 1, 2016, 201611139671.1, filed Dec. 12, 2016, 201611139114.X, filed Dec. 12, 2016, 201611139122.4, filed Dec. 12, 2016, 201611139125.8, filed Dec. 12, 2016, all of which are incorporated by reference herein.

TECHNICAL FIELD

The present disclosure relates to a vacuum cleaner, and more particularly relates to a vacuum cleaner having a dual filter.

BACKGROUND

With the continuing development of the society, safety performance requirements for vacuum cleaners are also getting higher and higher. To meet the existing vacuum cleaner industry standards, it generally needs to add a pre-filter outside of a main filter in order to protect the main filter.

Therefore, an anti-omission mechanism needs to be provided for each of the main filter and the pre-filter. A common anti-omission mechanism is implemented as a micro-switch. After being assembled, the main filter and the pre-filter individually touch the micro-switch to achieve the purpose of preventing omission. On the one hand, however, using two micro-switches leads to higher costs; on the other hand, an anti-omission structure needs to be separately designed for the main filter and the pre-filter. Because the structures are independent of each other, it leads to a high spatial cost.

Figure 13:
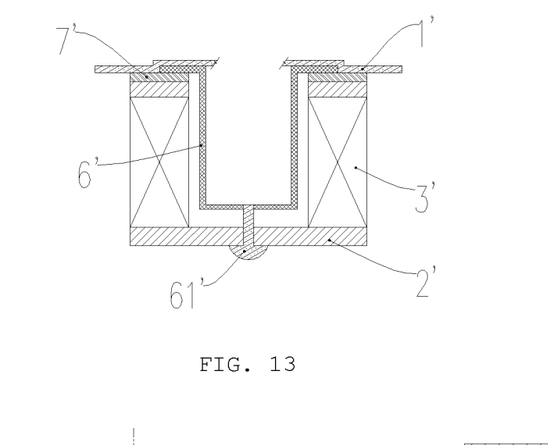
FIG. 13 illustrates a connection between the filter bracket and an electric motor mount in the prior art.

In another aspect, the vacuum cleaner has a high hermetic requirement that dust needs to be prevented from intruding into the electric motor chamber. Once the dust intrudes into the interior of the motor chamber, components may be affected. In some severe cases, the vacuum cleaner may be damaged. The vacuum cleaner in the prior art has a structure as shown in FIG. 13. A bottom end of a filter 3' is detachable and hermetically mounted on a filter bracket 2'. A hermetic member 7' is disposed between the top end of the filter 3' and the periphery of a fan cover 1' and an electric motor mount 6'. The electric motor mount 6' is generally tightly fastened to the filter bracket 2' at the bottom of the electric motor mount 6' by means of screw so that a certain upward pressure is exerted to the filter bracket 2' to make a lower end of the filter 3' press against the filter bracket 2', and thus further make the lower end of the filter 3' press against the outer periphery of the electric motor mount 6', and make the fan cover 1' and the upper end of the filter 3' to press against each other thereby achieving hermetic purposes. In the prior art, the hermetic pre-tightening forces among the electric motor mount 6', the fan cover 1', the filter 3' and the filter bracket 2' are totally provided by a bottom screw 61'. However, when the vacuum cleaner is in operation, the electric motor mount 6' would vibrate along with the vibration of the electric motor, so that the filter 3' would be deformed, causing the hermetic closure between the top end of the filter 3' and the outer periphery of the electric motor mount 6', and between the top end of the filter 3' and the fan cover 1' to get loose, or causing the hermetic closure between the bottom end of the filter 3' and the filter bracket 2' to get loose. This results in hermetic failure problems, such that dust may intrude into the interior of the motor chamber, causing damages to the equipment thus reducing its service life. In addition, since the hermetic closure of the vacuum cleaner described above includes a plurality of mating surfaces, if a hermetic failure should occur to any one of the mating surfaces, it would cause an entire hermetic failure of the vacuum cleaner.

In another aspect, in some prior art, an annular filter of the ash vacuum cleaner is substantially vertically mounted on the filter bracket, such that dust and debris intercepted by the filter fall along the filter and deposit on the filter bracket. As the amount of dust and debris deposited increases, the performance of the vacuum cleaner would significantly decline.

In another aspect, in some prior arts there are vacuum cleaners that include at least one micro-switch to sense whether the filter is installed, such as Chinese patent application CN106073638A and the like. However, the vacuum cleaners of the above technical solution have a problem in use that dust and debris would enter the micro-switch via the through hole provided between the micro-switch and the filter, causing the contactor of the micro-switch to be damaged.

SUMMARY

One object of the present disclosure is to solve the defects of the prior art by providing a vacuum cleaner which uses only one status sensor to achieve the purpose of dual-filter anti-omission, aiming to solve the problem that existing anti-omission mechanisms are complicated in structure and have a high cost.

A technical solution of the present disclosure is a vacuum cleaner that includes an unclean air inlet, a clean air outlet, and an air passage disposed between the unclean air inlet and the clean air outlet; a vacuum generator is disposed in the air passage, and a first filter is disposed at the upstream of the vacuum generator and a second filter is disposed at the upstream of the first filter; a status sensor is further included; in the first status, the first filter and the second filter are cooperating with each other to trigger the status sensor; in the second status, the first filter and the second filter are not cooperating with each other, and the status sensor is not triggered.

In an embodiment, the vacuum cleaner further includes a fan cover and a filter bracket; the outer periphery of the fan cover is provided with a through hole, and the status sensor is disposed corresponding to the through hole; the first end of the first filter is non-detachably and hermetically connected to the filter bracket, and the upstream side of the second end of the first filter is provided with a first protrusion, and the outer periphery of the filter bracket is provided with a second installation portion; in the first status, the second end of the first filter is hermetically connected to the fan cover, and the first end of the second filter is detachably and hermetically connected to the second installation portion and the second end of the second filter is inserted into the through hole to trigger the status sensor.

Preferably, the through hole is provided with an elastic arm, and one end of the elastic arm is provided with a pressing head, and the other end of the elastic arm is connected to an inner wall of the through hole.

Preferably, the second end of the first filter is provided with an end cover, and the upstream side of the end cover is provided with a first protrusion.

Preferably, the second installation portion is configured as a groove provided with at least one dust hole at the bottom.

Preferably, an inclined surface is disposed between two adjacent dust holes. The inclined surface is inclined downward from the midst to the both sides between the two adjacent dust holes, or the inclined surface is inclined downward from one of the dust holes to another of the dust holes adjacent thereto.

Preferably, at least one of the dust holes is provided with a springy member in it.

In another embodiment, the vacuum cleaner further includes a fan cover; an outer periphery of the fan cover is provided with a through hole, and the status sensor is disposed corresponding to the through hole; the fan cover further includes a linkage portion, which includes an abutment member disposed at the upstream side of the fan cover and a triggering member hinged to a middle portion of the abutment member, and the triggering member is inside the through hole and moves along the axis thereof; in the first status, the first filter presses against the first end of the abutment member, and the second filter presses against the second end of the abutment member, and the abutment member causes the triggering member to trigger the status sensor.

Preferably, one of the through holes or the triggering members is provided with at least one third protrusion, and the other one is provided with at least one sliding groove that cooperates with the third protrusion.

In other embodiments, the status sensor is a micro-switch, and the contactor of the micro-switch corresponds to the through hole.

Preferably, a first hermetic member is disposed between the status sensor and the through hole.

Preferably, a second hermetic member is disposed between the second end of the first filter and the fan cover.

Preferably, the side toward the second hermetic member of the second end of the first filter is provided with a second protrusion.

Preferably, the second protrusion includes at least one tall protrusion and at least one short protrusion, and at least one of the tall protrusion is disposed at an upstream side of at least one of the short protrusion.

After implementing the technical solution of the present disclosure, the significant technical progresses are as follows: (1) The anti-omission detection of the main filter and the pre-filter is achieved with only one status sensor, which saves the cost; (2) The top of the main filter and the top of the pre-filter conjointly drive and control the status sensor, which serves effective anti-omission detection; (3) The conjoint drive mechanism has a simple structure, and simplifies the installation of the main filter and the pre-filter, thereby saving spatial cost and reducing the overall volume of the product; (4) An elastic hermetic member is disposed between the status sensor and the through hole, which serve the dual purpose as a transmission structure, and as a dust barrier to prevent dust from intruding; (5) The filter bracket has an inner groove and an outer groove, which can restrict and support the main filter and the pre-filter at the same time; (6) The outer groove comprises at least one springy member, which can provide the pre-filter a thrust force toward the fan cover; (7) The outer groove comprises at least one dust hole, through which dust can be discharged in time to prevent dust accumulation.

As another aspect of the present disclosure, the object of the present disclosure is to provide a vacuum cleaner that avoids a hermetic failure.

The technical solution of the present disclosure is a vacuum cleaner which includes a head assembly, wherein the head assembly includes a fan cover and an electric motor mount that are fastening and hermetically connected to each other, and the electric motor mount includes a side wall and a bottom wall; a filter assembly, wherein the filter assembly and the electric motor mount are disposed on a same side of the fan cover, and the filter assembly is disposed at an outer periphery of the side wall and the bottom wall; a hermetic gap is defined between the free end of the filter assembly and the head assembly, and a second hermetic member is disposed in the hermetic gap; a spiral fitting structure is disposed between the free end of the filter assembly and the head assembly, and is screwed to tighten and narrow the hermetic gap.

Further, the thickness of the second hermetic member in the advance direction of screwing to be tightened is not less than the minimum width between the free end of the filter assembly and the head assembly.

Further, the thickness of the second hermetic member in an advance direction of screwing to be tightened is not less than a minimum gap between the end cover and the fan cover.

Further, a first thread is an external thread disposed outside the free end of the filter assembly; the head assembly is provided with a first threaded wall extending toward the bottom wall, and the second thread is an internal thread disposed inside the first threaded wall.

Further, the first thread is an internal thread disposed inside the free end of the filter assembly; and the second thread is an external thread disposed on an outer surface of the side wall.

Further, a second threaded wall is provided at the end of the side wall away from the bottom wall, and a second thread is an external thread disposed on the outer surface of the second threaded wall.

Further, the second threaded wall protrudes from the side wall in a radial direction of the electric motor mount.

Further, the side of the free end of the filter assembly facing toward the head assembly is provided with a second protrusion.

Further, the free end of the filter assembly is provided with the end cover that is tightly and hermetically connected to the filter assembly; the first thread is disposed on the inner side or the outer side of the end cover, and the side of the end cover facing toward the head assembly is provided with the second protrusion.

Further, the filter assembly includes the filter bracket and the first filter, and the first end of the first filter is tightly and hermetically connected to the filter bracket.

The disclosure further involves a method for assembling the above vacuum cleaner, including the following steps: cover the filter assembly from the end away from the head assembly to the periphery of the electric motor mount to make the spiral fitting structure to fit; rotate the filter assembly and tighten the spiral fitting structure to make the free end of the filter assembly and the head assembly press against the second hermetic member.

After implementing the technical solution of the present disclosure, significant technological advances are as follows: the end cover of the filter is tightly fitted with the electric motor mount to form an integrity, and the filter, the end cover, the filter bracket and the electric motor mount are fixed relative to one another, so that the vibration of the electric motor mount during the operation of the vacuum cleaner does not cause deformation of the filter, and the hermetic member does not loosen, thereby ensuring the hermetic performance. The protrusion of the top end surface of the end cover abuts against the bottom surface of the hermetic member, thereby further improving the hermetic performance. Hermetic mating surfaces of the present disclosure are only on the end cover of the filter, the second threaded wall and the fan cover, reducing the number of hermetic mating surfaces, which not only greatly simplifies the assembly process, but improves the stability and reliability of the overall hermetic.

As another aspect of the present disclosure, an object of the present disclosure is to provide a filter bracket which can effectively prevent the deposition of dust and debris.

The technical solution of the present disclosure is a filter bracket which includes at least one filter installation portion, which is configured as a groove having at least one dust hole at the bottom.

Further, an inclined surface downward toward the dust hole is disposed between the two adjacent dust holes.

Further, the inclined surface is disposed between two adjacent dust holes, and is inclined downward from the midst to the both sides between the two adjacent dust holes.

Further, the inclined surface is disposed between two adjacent dust holes, and is inclined downward from one of the dust holes to another of the dust holes adjacent thereto.

Further, at least one of the dust holes is provided with the springy member.

Further, the filter installation portion includes a first installation portion and a second installation portion disposed both at an outer periphery thereof, and the first installation portion is disposed inside the second installation portion.

Further, the dust hole is defined in the second installation portion.

The present disclosure further provides a filter assembly, including the above filter bracket and at least one filter mounted at the filter installation portion.

The present disclosure further provides a vacuum cleaner, including the above filter assembly.

After implementing the technical solution of the present disclosure, significant technological advances are as follows: the filter bracket has an inner groove and an outer groove, which can restrict and support the main filter and the pre-filter at the same time. The outer groove has a springy member, which can provide the pre-filter a thrust force toward the fan cover. The outer groove comprises at least one dust hole, through which dust and debris can be discharged in time to prevent dust accumulation As another aspect of the present disclosure, the object of the present disclosure is to provide a hermetic structure capable of effectively preventing dust leakage.

The technical solution of the present disclosure is a hermetic structure which includes a separator, one side of which is a clean area, and the other side of which is an unclean area, and the separator is provided with a through hole communicating the clean area and the unclean area; a receiving groove, disposed in the clean area; a status sensor, installed inside the receiving groove, and including a contact facing toward the through hole; and a first hermetic member, made of an elastic material and disposed between the contact and the through hole.

Further, the inner diameter of the receiving groove is larger than the diameter of the through hole.

Further, the first hermetic member is disposed at one end of the receiving groove facing toward the through hole.

Further, the periphery of the through hole is provided with a convex wall extending from the separator to the clean area, and the convex wall and the separator are enclosed to form the receiving groove.

Further, the first hermetic member is plate-like.

Further, a transmission member disposed in the through hole is further included, and one end of the transmission member is selectively abutted against the contact.

The present disclosure further provides a vacuum cleaner which includes a fan cover, one side of which is a clean area, and the other side of which is an unclean area, and the fan cover is provided with a through hole communicating the clean area and the unclean area; a receiving groove, disposed in the clean area; a status sensor, installed inside the receiving groove, and including a contact facing toward the through hole; an installation member, at least partially installed from the unclean area corresponding to the through hole and applying a pressure to the contact; and a first hermetic member, made of an elastic material and disposed between the contact and the through hole.

Further, a transmission member disposed in the through hole is further included. One end of the transmission member is selectively abutted against the contact, and the other end is selectively abutted against or connected to the installation member.

Further, the installation member is a filter.

Further, the status sensor is a micro-switch.

The technical effects that can be achieved by the present disclosure are as follows: an elastic hermetic member is disposed between the micro-switch and the through hole, achieving a good hermetic effect while realizing transmission, preventing external dust and debris from entering the vicinity of the micro-switch contact which would otherwise cause the micro-switch to be damaged.

DETAILED DESCRIPTION

Figure 1:
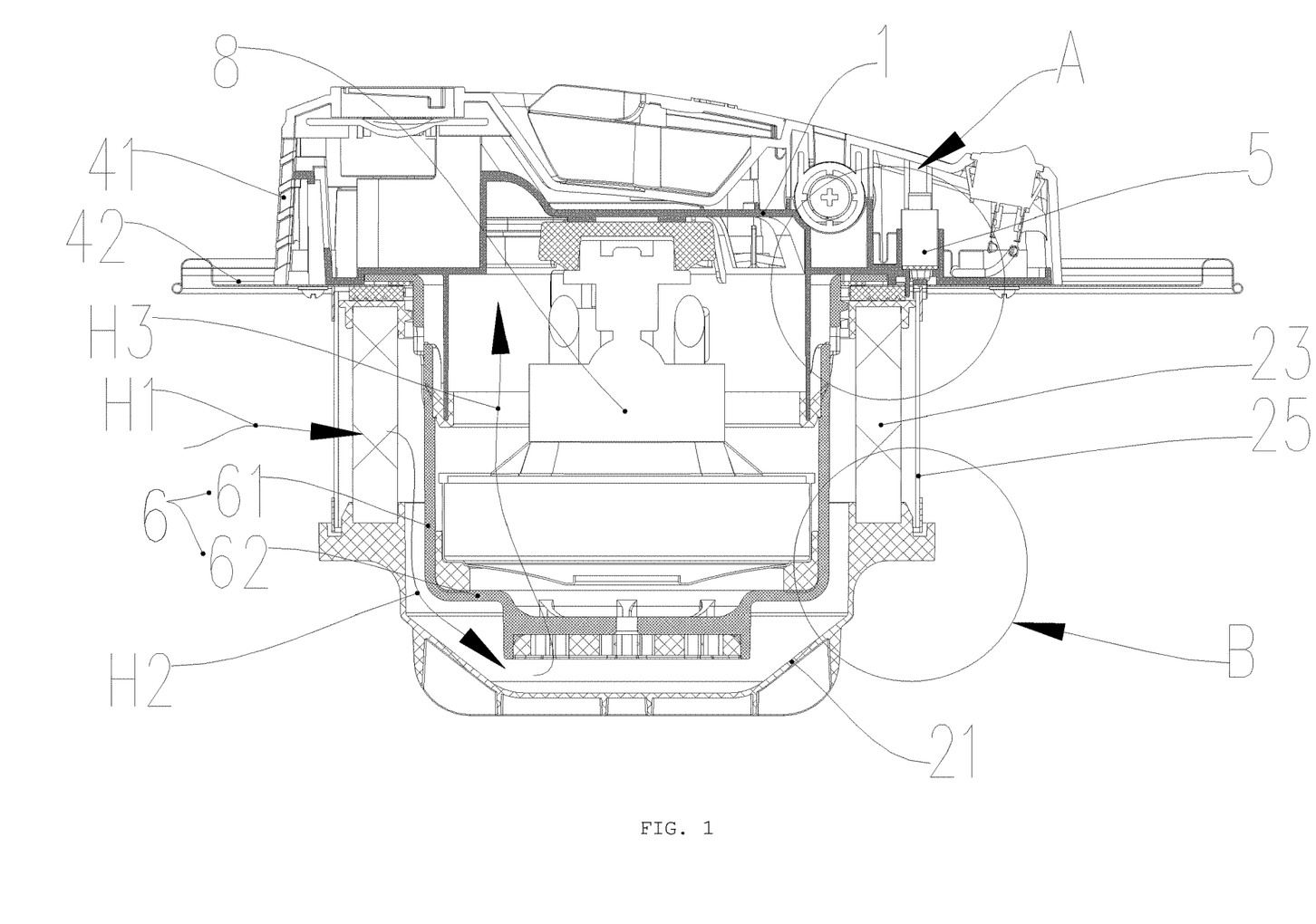
FIG. 1 is a schematic diagram illustrating an embodiment of a vacuum cleaner in accordance with the present disclosure.

The present disclosure provides a vacuum cleaner having a dual filter, including an unclean air inlet (not shown), a clean air outlet (not shown), and an air passage disposed between the unclean air inlet and the clean air outlet, and a vacuum generator 8 is disposed inside the air passage, in particular, the vacuum generator 8 is an impeller driven by an electric motor. A first filter 23 is provided on the upstream of the vacuum generator 8, and in particular, the first filter is a HEPA filter. A second filter 25 is provided at the upstream of the first filter 23, and in particular, the second filter 25 is an iron mesh cover. As illustrated in FIG. 1, in the present embodiment, the vacuum cleaner further includes a fan cover 1, a filter bracket 21, an electric motor mount 6, an upper cover 41 including the clean air outlet, a dust storage bucket (not shown) including the unclean air inlet, and a cylinder cover 42. The vacuum generator 8 is installed inside the electric motor mount 6, which includes a side wall 61 and a bottom wall 62 connected to one end of the side wall 61. In the present embodiment, the side wall 61 and the bottom wall 62 are integrally formed. The bottom wall 62 is provided with an electric motor air inlet, and the end of the side wall 61 away from the bottom wall 62 has a second threaded wall 63. The second threaded wall 63 protrudes from the side wall 61 in the radial direction of the electric motor mount 6, that is, the inner diameter of the second threaded wall 63 is larger than the inner diameter of the side wall 61. Thus, when the first filter 23 is installed on the outer periphery of the electric motor mount 6, an air passage can be formed between the side wall 61 of the electric motor mount 6 and the inner side of the first filter 23. An end of the second threaded wall 63 remote from the bottom wall 62 is provided with a flange 632 extending outwardly. The electric motor mount 6 is tightly installed on a lower portion of the fan cover 1, that is, the second threaded wall 63 is tightly connected to the fan cover 1; the upper cover 41 is installed on an upper portion of the fan cover 1, and the filter bracket 21 is installed on an lower portion of the bottom wall 62 of the electric motor mount; the first filter 23 and the second filter 25 are installed between the filter bracket 21 outside the side wall 61 of the electric motor mount and the fan cover 1, and the first filter 23 is inside the second filter 25, and the dust storage bucket is installed below the outer periphery of the cylinder cover 42; the flange 632 of the electric motor mount 6 is interposed between the inner periphery of the cylinder cover 42 and the fan cover, and the cylinder cover 42 and the fan cover 1 are tightly connected by screws, in addition, a hermetic member or a hermetic structure is disposed between the electric motor mount 6 and the fan cover to tightly and hermetically connect the electric motor mount 6 and the fan cover 1 to each other. In the above structure, under the action of the vacuum generator 8, the unclean air enters the dust storage bucket from the unclean air inlet, and sequentially passes through the second filter 25 and the first filter 23 along the path H1. The second filter 25 intercepts coarse dust and debris, and the first filter 23 further intercepts fine dust and debris. The dust and debris intercepted by the filter are retained in the dust storage bucket, and the clean air passes along the path H2 from the first filter 23 to the electric motor air inlet at the lower portion of the electric motor mount 6 via the air passage between the filter bracket 21 and the electric motor mount 6, and then along the path H3, enters the inner space defined by the electric motor mount 6 and the fan cover 1, and then passes through the space defined by the fan cover 1 and the upper cover 41 and is finally discharged from the clean air outlet. In the present embodiment, the vacuum cleaner further includes a status sensor 5. In the first status, the first filter 23 and the second filter 25 are cooperating with each other to trigger the status sensor 5; in the second status, the first filter 23 and the second filter 25 are not cooperating with each other, and the status sensor 5 is not triggered. In the present disclosure, the fan cover 1 and the electric motor mount 6 which are tightly and hermetically connected with each other constitute a head assembly. Certainly, the head assembly further includes the upper cover 41, the cylinder cover 42, the vacuum cleaner 8 and the like; the first filter 23 and the filter bracket 21, which are tightly and hermetically connected with each other constitute a filter assembly. Certainly, the filter assembly further includes the second filter 25, an end cover 24, and the like.

The outer periphery of the fan cover 1 is provided with a through hole 11. Specifically, the through hole 11 is disposed on the outer side of the fan cover 1 relative to the electric motor mount 6, that is, on the upstream side of the electric motor mount 6. The status sensor 5 is disposed corresponding to the through hole 11. Specifically, in the present embodiment, the status sensor 5 is a micro-switch. The micro-switch is disposed in the vicinity of the through hole 11 and the contactor of the micro-switch corresponds to the through hole 11. In other embodiments, the periphery of the through hole 11 is provided with a convex wall extending above the fan cover 1, and the convex wall forms a micro-switch receiving groove, and the micro-switch is installed inside the receiving groove with the contact downward state to make the contacts face toward the through holes.

For convenience of description, orientations in the disclosure are defined as follows. First, based on the above airflow directions, the direction toward the unclean air inlet is defined as "upstream", and the direction toward the clean air outlet is defined as "downstream". For example, in the above structure, the first filter 23 is disposed at the downstream of the second filter 25, and the side of the first filter 23 adjacent to the second filter 25 is referred to as an upstream surface, and the side away from the second filter 25 is referred to as downstream surface. Second, based on the longitudinal axis of the vacuum generator 8, the direction toward the longitudinal axis of the vacuum generator 8 is referred to as "inner", and the direction away from the longitudinal axis of the vacuum generator 8 is referred to as "outer". For example, in the above structure, the first filter 23 is disposed inside the second filter 25, and the side of the first filter 23 adjacent to the second filter 25 is referred to as an outer side surface thereof. Third, the terms "upper" and "lower" are used to describe the relative orientations in the drawings.

Embodiment One

In the present embodiment, as illustrated in FIGS. 2-9, an elastic arm 121 is provided in the through hole 11. One end of the elastic arm 121 is provided with a pressing head 1211, and the thickness of the pressing head 1211 is significantly larger than that of the elastic arm 121, specifically, the pressing head 1211 protrudes downward. In other embodiments, the pressing head 1211 protrudes upward. The other end of the elastic arm 121 is connected to an inner wall of the through hole 11, specifically, the elastic arm 121 is integrally formed with the fan cover 1, and since the elastic arm 121 itself is made of an elastic material, the pressing head 1211 can move up and down along the axis of the through hole 11. Specifically, when applied a pressure, the pressing head 1211 is operative to move along the pressure direction; and when the pressure is released, the pressing head 1211 is reset under the action of the elastic arm 121. In other embodiments, the elastic arm 121 is resiliently and pivotally connected to the inner wall of the through hole 11.

In the present embodiment, a first hermetic member 52 is provided between the micro-switch and the through hole 11. Specifically, the first hermetic member 52 is made of an elastic material and is disposed between the micro-switch contact and the pressing head 1211. Further, the first hermetic member 52 is substantially plate-like and is filled in the micro-switch receiving groove to seal the through hole 11. When the pressing head 1211 is forced to move toward the micro-switch contact, the first hermetic member 52 is pressed and itself is at least partially elastically deformed, and the elastic deformation portion presses the micro-switch contact to trigger the micro-switch; when the force is unloaded, the pressing head 1211 is separated from the first hermetic member 52, and the first hermetic member 52 is restored to the original state and separated from the micro-switch contact, and the micro-switch is triggered to be released. The configuration of the first hermetic member 52 not only serves as a transmission device but also effectively seals the through hole 11 to prevent dust from entering the micro-switch causing damage thereof.

A first end 231 of the first filter 23 is non-detachably and hermetically connected to the filter bracket 21. In the present embodiment, the outer periphery of the filter bracket 21 is provided with a first installation portion 211. Specifically, the first installation portion 211 is a groove, and the first end 231 of the first filter 23 is inserted inside the first installation portion 211 with interference fit. In other embodiments, the first end 231 of the first filter 23 is hermetically fixed to the filter bracket 21 by means of adhesive. In other embodiments, the first end 231 of the first filter 23 is hermetically fixed to the filter bracket 21 by means of a threaded structure. In other embodiments, the first end 231 of the first filter 23 is integrally formed with the filter bracket 21. A first protrusion 241 is provided on the upstream side of the second end 232 of the first filter 23. In the present embodiment, the second end 232 of the first filter 23 is provided with the end cover 24 that encloses the second end 232 of the first filter 23. Specifically, the end cover 24 is connected to the second end 232 of the first filter 23 by means of adhesive. In other embodiments, the end cover 24 is integrally formed with the second end 232 of the first filter 23. A first protrusion 241 is disposed at the upstream side of the end cover 24, and a first thread 242 is disposed at the downstream side of the end cover 24, and the side of the end cover 24 away from the first end 231 of the first filter 23 is provided with a second protrusion 243. Specifically, the second protrusion 243 has a approximately sharpened end. In other embodiments, the second protrusion 243 includes at least one tall protrusion 2431 and at least one short protrusion 2432, and the height of the tall protrusion 2431 is greater than that of the short protrusion 2432. In other embodiments, the second protrusion 243 includes a tall protrusion 2431 and a short protrusion 2432 from the upstream side to the downstream side in sequence. In other embodiments, the second protrusion 243 includes a tall protrusion 2431, two short protrusions 2432 and a tall protrusion 2431 from the upstream side to the downstream side in sequence. The configuration of the second protrusion 243 can continue to be effective by the short protrusion 2432 after the upstream tall protrusion 2431 over-attritionally lost efficacy.

Figure 8:
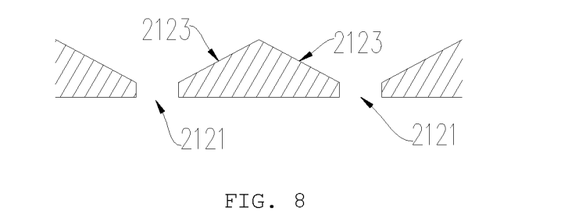
FIG. 8 is a schematic diagram illustrating an embodiment of a dust hole and an inclined surface in accordance with the present disclosure.
Figure 9:
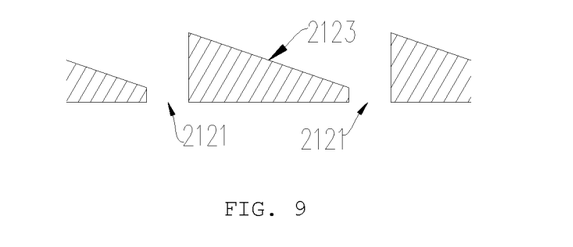
FIG. 9 is a schematic diagram illustrating another embodiment of the dust hole and the inclined surface in accordance with the present disclosure.

The outer periphery of the filter bracket 21 is provided with a second installation portion 212. Specifically, the second installation portion 212 is disposed at the upstream side of the first installation portion 211. In the present embodiment, the second installation portion 212 is a groove provided with at least one dust hole 2121 at the bottom. The dust and debris intercepted by the second filter 25 fall into the groove of the second installation portion 212 and fall into a dust collecting bucket via the dust hole 2121, thereby avoiding the accumulation of dust and debris. In the present embodiment, an inclined surface 2123 is provided between two adjacent dust holes 2121. As illustrated in FIG. 8, the middle portion between the adjacent two dust holes 2121 is the highest, and both sides of the highest middle portion is the inclined surface 2123 which is inclined downward and toward the dust hole 2121. In other embodiments, as illustrated in FIG. 9, one side of the dust hole 2121 is the highest and the other side is the lowest, that is, between two adjacent dust holes 2121, the inclined surface 2123 is formed downward from one dust hole toward the other dust hole. The inclined surface 2123 is provided between the dust holes 2121, so that dust and debris falling in the second installation portion 212 move toward the dust hole under the action of gravity to further prevent accumulation of dust and debris. In the present embodiment, at least one dust hole 2121 is provided with an upwardly inclined springy member 2122 inside, for supplying an upward pre-tightening force to the second filter 25 installed in the second installation portion 212.

In the present embodiment, the first end 251 of the second filter 25 is provided with a first wrapping edge member 2531, and the second end 252 of the second filter 25 is provided with a second wrapping edge member 2532. Specifically, the first wrapping edge member 2531 and the second wrapping edge member 2532 are made of elastic materials, which can not only prevent the edge of the second filter 25 from causing damage to other components of the vacuum cleaner but also provide a certain hermetic effect.

In the first status, the second end 232 of the first filter 23 is hermetically connected to the fan cover 1, and the first end 251 of the second filter 25 is detachable and hermetically connected to the second installation portion 212 and the second end 252 of the second filter 25 is inserted into the through hole 11. The first protrusion 241 and the through hole 11 limit the second end 252 of the second filter 25 in the radial direction of the through hole 11 and push up the pressing head 1211 to exert an upward pressure to the first hermetic member 52, so that the first hermetic member 52 is partially elastically deformed, and the elastically deformed portion is upwardly pressed against the micro-switch contact. At this moment, a control device of the vacuum cleaner determines that the filters are fully installed in proper place, and then the vacuum cleaner is allowed to start.

If only the first filter 23 is installed and the second filter 25 is not installed, due to the limitations of the above structure, the micro-switch cannot be triggered, and the control device of the vacuum cleaner determines that the filter is not fully installed, and then the vacuum cleaner is not allowed to start. If the first filter 23 is not installed, the second filter 25 lacks the lower support due to the lack of the filter bracket 21, and the micro-switch cannot be triggered, then the control device of the vacuum cleaner determines that the filter is not fully installed, and then the vacuum cleaner is not allowed to start. The status where the above filters are not fully installed in proper place is referred to as the second status.

Figure 14:
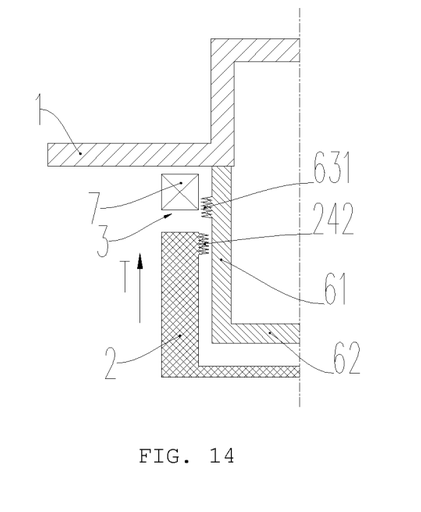
FIG. 14 illustrates an embodiment of a connection between a head assembly and a filter assembly in accordance with the present disclosure.
Figure 15:
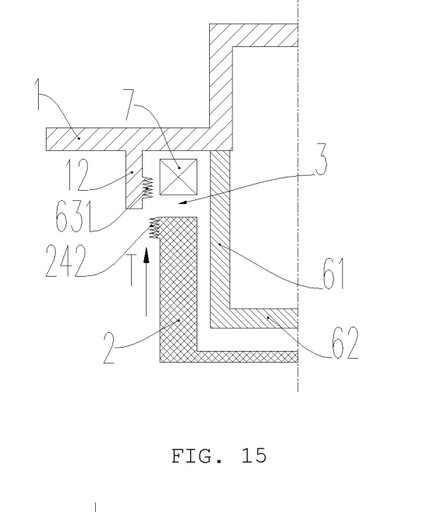
FIG. 15 illustrates another embodiment of the connection between a head assembly and a filter assembly in accordance with the present disclosure.
Figure 16:
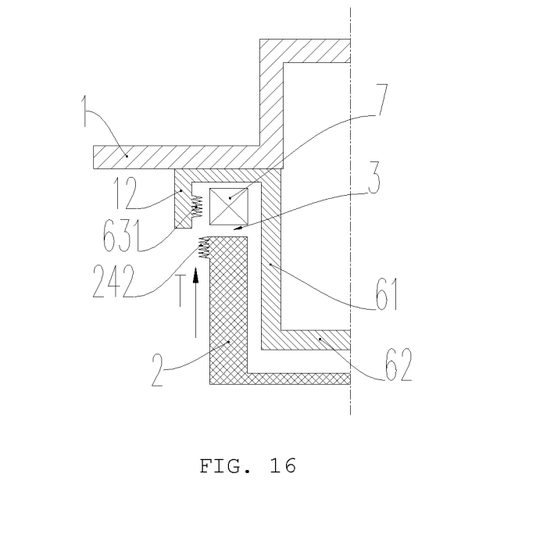
FIG. 16 illustrates still another embodiment of the connection between a head assembly and a filter assembly in accordance with the present disclosure.

The present disclosure further provides a method of connecting the head assembly to the filter assembly 2, as illustrated in FIGS. 14~16. Since the vacuum cleaner generally has a substantially symmetrical structure, for the sake of brevity, only a schematic cross-sectional view of half of the vacuum cleaner is illustrated in FIGS. 14~16. The head assembly in the figures shows only the fan cover 1 and the electric motor mount 6 which are tightly and hermetically connected with each other and the filter assembly 2 is shown as a whole. In the present embodiment, the filter assembly 2 and the electric motor mount 6 are disposed on the same side of the fan cover 1, and the filter assembly 2 is wrapped around the outer periphery of the side wall 61 and the bottom wall 62, that is, the filter assembly 2 is disposed at the upstream of the electric motor mount 6. A hermetic gap 3 exists between the free end of the filter assembly 2 and the head assembly. One of the free end of the filter assembly 2 and the head assembly includes the first thread 242 disposed in a circumferential direction thereof, and the other includes a second thread 631 corresponding to and complementary to the position of the first thread 242. The first thread 242 and the second thread 631 define a tightly fixing path between the free end of the filter assembly 2 and the head assembly. When the first thread 242 is tightened with the second thread 631, the free end of the filter assembly 2 gradually approaches the head assembly in the advance direction T of screwing and the direction T is approximately perpendicular to the spiral surface and is substantially parallel to the axial direction of the vacuum cleaner, so that the hermetic gap 3 is gradually reduced. When the first thread 242 and the second thread 631 are screwed to the end of the thread along the tightly fixing path, the distance between the free end of the filter assembly 2 and the head assembly is minimal and is referred to as the minimum width. A second hermetic member 7 is provided inside the hermetic gap 3, and the thickness of the second hermetic member 7 in the advance direction of screwing to be tightened is not less than the minimum width.

In one embodiment, the first thread 242 is an external thread disposed outside the free end of the filter assembly 2, and the head assembly is provided with a first threaded wall 12 extending toward the direction of the bottom wall 62, and the second thread 631 is an internal thread disposed inside the first threaded wall 12. In one embodiment, the first threaded wall 12 extends downwardly from the fan cover 1, as illustrated in FIG. 14. In another embodiment, the first threaded wall 12 extends downwardly from the outwardly extending outer periphery of one end of the side wall 61 of the electric motor mount 6 away from the bottom wall 62, as illustrated in FIG. 15. In the present embodiment, an inner diameter of the first spiral wall 12 is adapted to the outer diameter of the filter assembly 2, and specifically, the inner diameter of the first spiral wall 12 is not less than the outer diameter of the filter assembly 12. Based on the present embodiment, those people skilled in the art can easily think of providing additional internal threads on the inner side of the free end of the filter assembly 2, at the same time, on the outside of the side wall 61 of the electric motor mount 6, an additional external thread which is correspondingly and complementary to the position of the additional internal thread can further enhance the tightly connected and hermetic effect.

In another embodiment, the first thread 242 is an internal thread disposed inside the free end of the filter assembly 2; the second thread 631 is an external thread disposed on the outer surface of the side wall 61, as illustrated in FIG. 16. In the present embodiment, the outer diameter of the side wall 61 of the electric motor mount 6 is adapted to the inner diameter of the filter assembly 2, and specifically, the outer diameter of the side wall 61 of the electric motor mount 6 is not greater than the inner diameter of the filter assembly 2.

Figure 2:
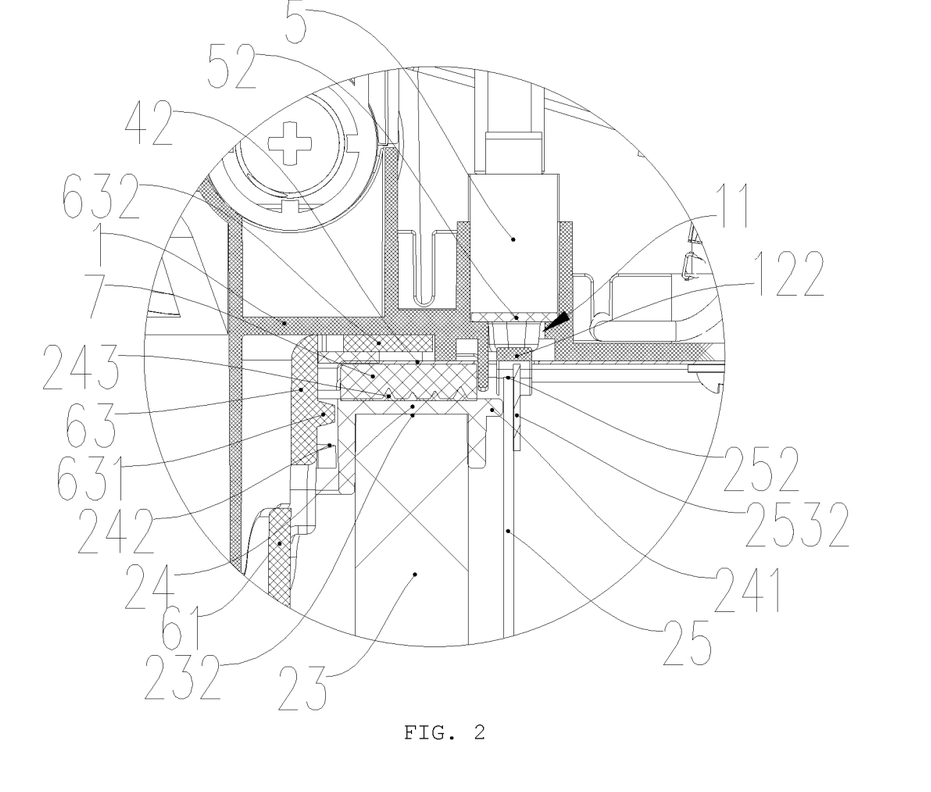
FIG. 2 is an enlarged schematic diagram illustrating the structure of area A of FIG. 1.
Figure 3:
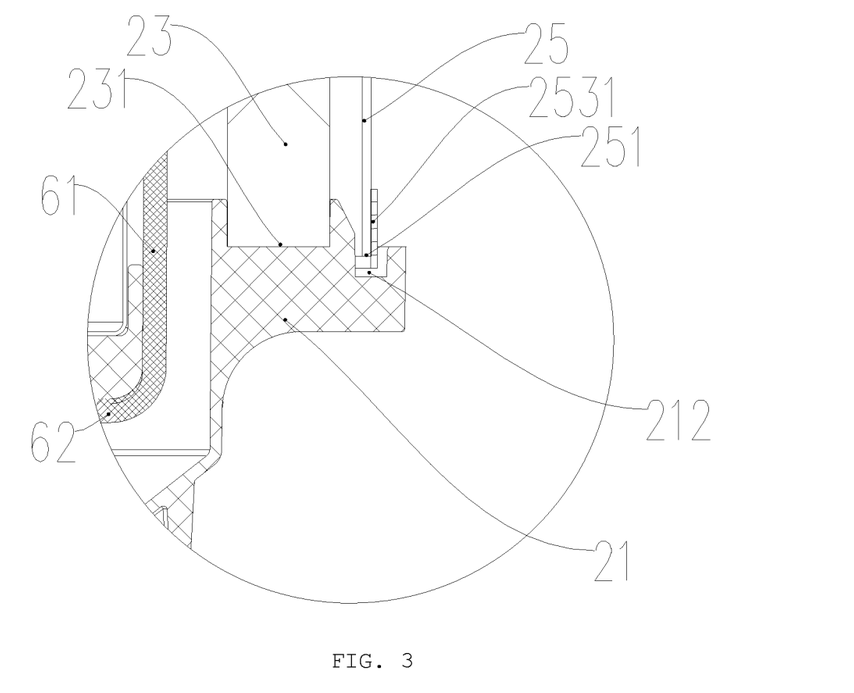
FIG. 3 is an enlarged schematic diagram illustrating the structure of area B of FIG. 1.
Figure 4:
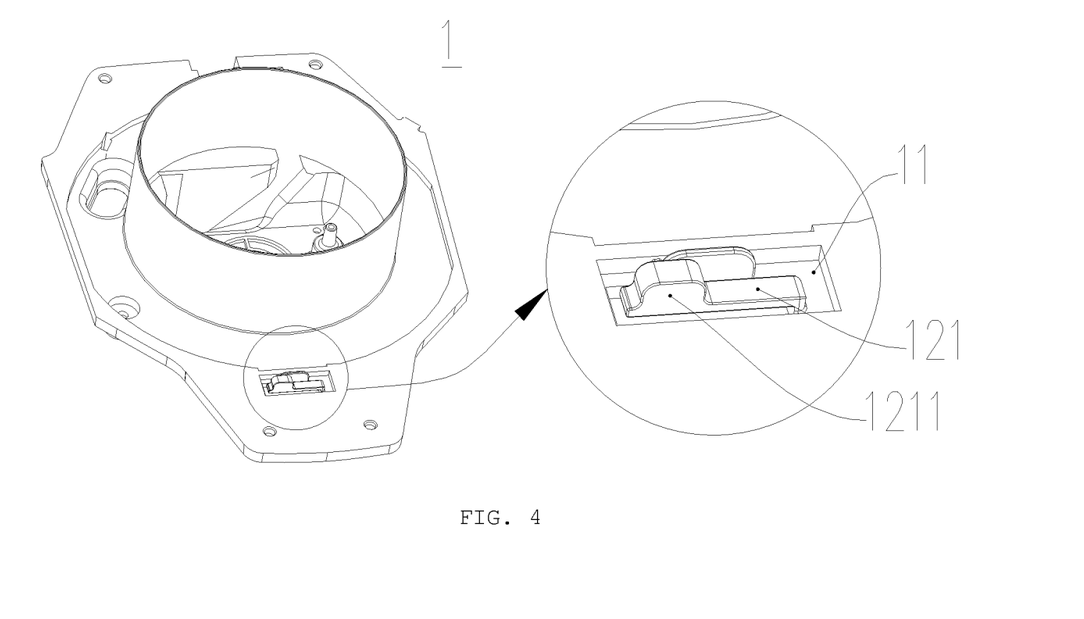
FIG. 4 is a schematic and partial enlarged diagram illustrating a fan cover in accordance with the present disclosure.
Figure 5:
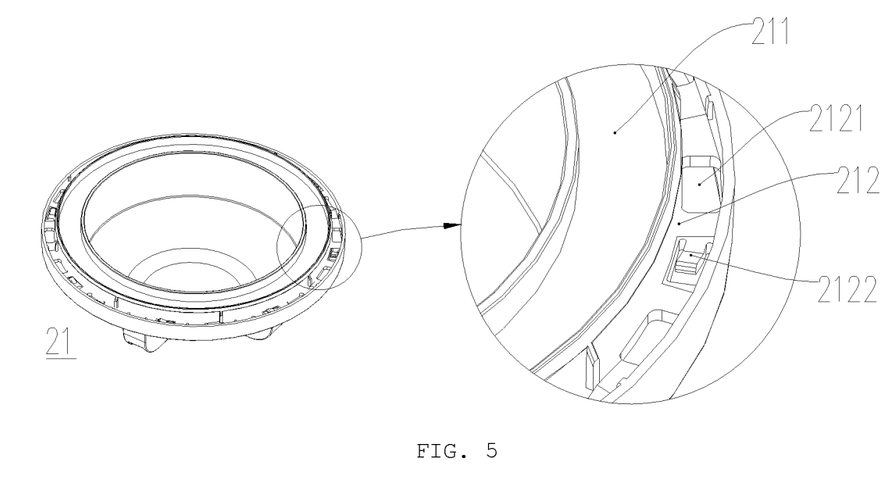
FIG. 5 is a schematic and partial enlarged diagram illustrating a filter bracket in accordance with the present disclosure.
Figure 6:
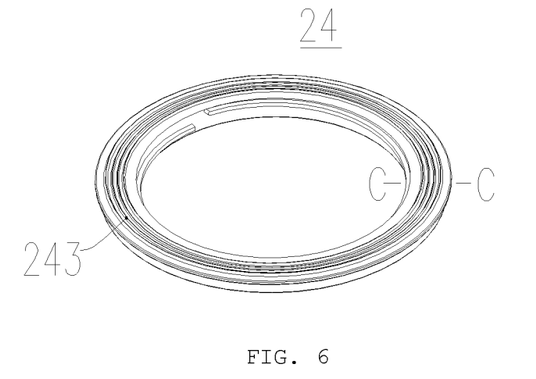
FIG. 6 is a schematic diagram illustrating an end cover in accordance with the present disclosure.
Figure 7:
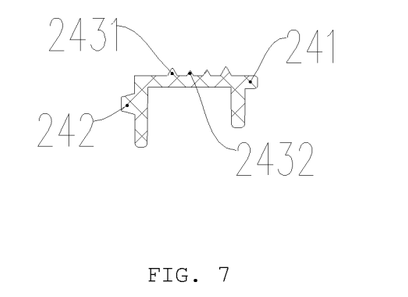
FIG. 7 is a cross-sectional view taken along line C-C of FIG. 6.

Specifically, as illustrated in FIGS. 1~2, the second thread 631 is disposed outside a second threaded wall 63, and the second end 232 of the first filter 23 and the fan cover 1 clamp the second hermetic member 7 and the flange 632. When the installation of the vacuum cleaner is performed, the filter assembly 2 is configured to cover the outer periphery of the electric motor mount 6 from the end away from the second threaded wall 63, and make the first thread 242 correspond to the second thread 631; rotate the filter assembly 2, the first thread 242 and the second thread 631 are tightly connected in the advance direction T of screwing to be tightened such that the end cover 24 and the fan cover 1 press against the second hermetic member 7. In particular, the thickness of the second hermetic member 7 in the advance direction T of screwing to be tightened is not less than the minimum width between the end cover 24 and the fan cover 1. That is, when the first thread 242 and the second thread 631 are fully tightened in the advance direction T of screwing to be tightened, a preset gap width g exists between the end cover 24 and the fan cover 1, and the thickness of the second hermetic member 7 in the tightly connected direction is d, then d≥g. Thus, the hermetic effect between the end cover 24 and the fan cover 1 is related to the degree of tightening of the first thread 242 and the second thread 631, that is, the larger the degree of tightening, the smaller the actual gap between the end cover 24 and the fan cover 1 and the tighter the second hermetic member 7, and then the better the hermetic effect. When the thickness of the second hermetic member 7 or other components has a certain manufacturing error, as long as the first thread 242 and the second thread 631 clamp the second hermetic member 7, the hermetic effect will not be attenuated by this error. In particular, when the preset gap width g is 0, the influence of the thickness dimension d of the first hermetic member 7 on the hermetic effect is substantially negligible. In the first status, the first thread 242 is engaged with the second thread 631, which not only supplies the pre-tightening force to the first filter 23 to press against the fan cover 1 upward, but provides further hermetic performance between the space, between the first filter 23 and the electric motor mount 6, and the external environment. The installation structure of the electric motor mount and the filter can effectively avoid the hermetic failure caused by the vibration of the electric motor when the vacuum cleaner is in operation. Specifically, when the vacuum cleaner is in operation, since the electric motor is fixed to the electric motor mount 6, the electric motor mount 6 vibrates in both radial direction and axial direction thereof. Since the second end 232 of the first filter 23 does not move relative to the fan cover 1 and the second threaded wall 63, the hermetic failure of the first filter 23 will not occur due to vibration, regardless of whether the first filter 23 itself is deformed.

When the second end 232 of the first filter 23 is hermetically connected to the fan cover 1, the end cover 24 presses the second hermetic member 7 upward. The second protrusion 243 on the end cover 24 presses against the second hermetic member 7, and since the second protrusion 243 has an approximately sharpened top end, the second hermetic member 7 is pressed with a larger pressure, even at least partially inserted into the second hermetic member 7 to further enhance the hermetic effect.

Embodiment Two

Figure 10:
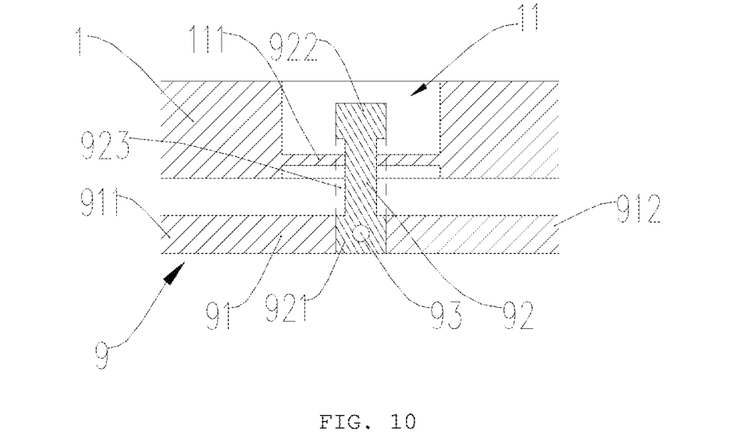
FIG. 10 is a schematic diagram illustrating the vacuum cleaner in another embodiment without installing a filter in accordance with the present disclosure.
Figure 11:
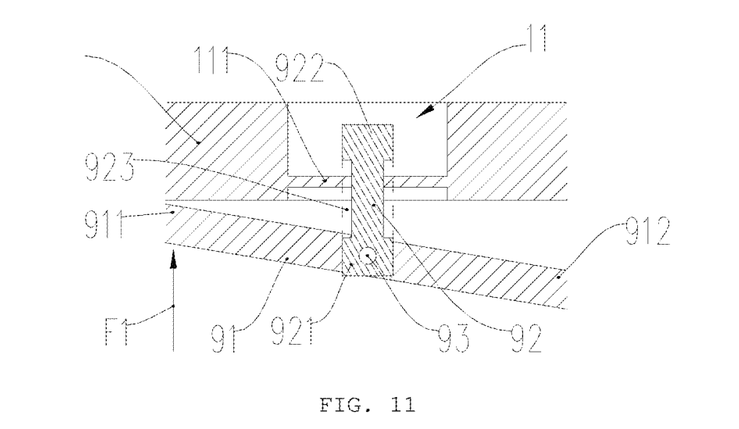
FIG. 11 is a schematic diagram illustrating the vacuum cleaner in another embodiment where only one filter is installed in accordance with the present disclosure.
Figure 12:
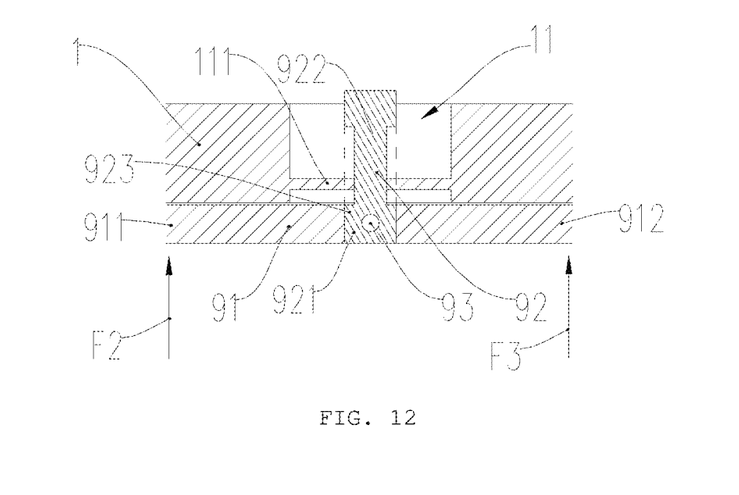
FIG. 12 is a schematic diagram illustrating the vacuum cleaner in another embodiment where two filters are installed in accordance with the present disclosure.

In the present embodiment, as illustrated in FIG. 10, the fan cover 1 further includes a linkage portion 9 including an abutment member 91 disposed at the upstream side of the fan cover 1 and a triggering member 92 hinged to the middle portion of the abutment member 91, and the triggering member 92 moves along the axis inside the through hole 11. Specifically, the abutment member 91 and the triggering member 92 are both rod-shaped. The first end 911 of the abutment member 91 corresponds to the installation position of the first filter 23, and the second end 912 of the abutment member 91 corresponds to the installation position of the second filter 25. The first end 921 of the triggering member 92 is pivotally connected to the middle of the abutment member 91 via a pivot shaft 93, and a sliding groove 923 is symmetrically disposed on both sides of the triggering member. The position of the inner wall of the through hole 11 corresponding to the sliding groove 923 extends toward the center of the through hole 11 to form a symmetrical third protrusion 111, which cooperates with the sliding groove 923 to move the triggering member 92 substantially along the axis of the through hole 11. When the first filter 23 and the second filter 25 are not installed, under the action of gravity, the linkage portion 9 gets lowered, and the second end 922 of the triggering member 92 is disengaged from the contact of the micro-switch or is in no force contact, thereby the micro-switch cannot be triggered and the control device of the vacuum cleaner determines that the filters are not fully installed and does not allow the vacuum cleaner to start. As illustrated in FIG. 11, when only the first filter 23 is installed and the second filter 25 is not installed, the first end 911 of the abutment member 91 tilts up under the action of the upward force F1 by the first filter 23, however, the second end 912 of the first filter 23 gets lowered due to no force is applied, and the entire abutment member 91 is only rotated about the pivot shaft 93 without causing the linkage portion 9 to rise significantly as a whole, therefore, the contact of the micro-switch cannot be touched or the force is continuously applied, and the micro-switch cannot be triggered, then the control device of the vacuum cleaner determines that the filters are not fully installed and does not allow the vacuum cleaner to start. The case when only the second filter 25 is installed and the first filter 23 is not installed will not be described herein again. As illustrated in FIG. 12, when the first filter 23 and the second filter 25 are all both installed, the first end 911 of the abutment member 91 is tilted up under the action of the upward force F1 applied by the first filter 23, the second end 912 of the abutment member 91 is tilted up under the action of the upward force F2 applied by the second filter 25, causing the linkage portion 9 to rise as a whole. The second end 922 of the triggering member 92 touches the contact of the micro-switch and continuously applies force thereto, and the control device of the vacuum cleaner determines that the filters are installed in position and then allows the vacuum cleaner to start.

As can be found from the above description, the anti-omission system of the vacuum cleaner according to the present disclosure can achieve the anti-omission detection of the main filter and the pre-filter at the same time via one micro-switch, thereby saving cost. The top of the main filter and the top of the pre-filter are operative to be driven in conjunction, and to control the micro-switch, which effectively performs the anti-omission detection; the joint drive mechanism has a simple structure, and simplifies the installation of the main filter and the pre-filter, while saves space cost and reduces the overall volume of the product; the elastic hermetic member is disposed between the micro-switch contact and the top of the through hole, and the elastic hermetic member can serve as a transmission structure, at the same time acts as a dust-proof to prevent dust from intruding. In addition, in the hermetic system of the present disclosure, the end cover of the main filter is tightly integrated with the electric motor mount, and the main filter, the end cover, the filter bracket and the electric motor mount are relatively fixed, so that the vibration of the electric motor mount when the vacuum cleaner is in operation does not cause the main filter to deform, and the hermetic member will not loosen thus guaranteeing the hermetic performance; the plurality of protrusions on the top end surface of the end cover abut against the bottom surface of the hermetic member, thereby further improving the hermetic performance; the pre-filter is added to realize the pre-filtering function, which effectively protects the main filter; the filter bracket has the inner groove and the outer groove, which can support and limit the main filter and the pre-filter at the same time; the outer groove has an elastic member operative to provide a thrust to the pre-filter toward the fan cover; the outer groove has the dust hole, which can discharge the intruding dust in time to prevent dust accumulation.

We claim:
1. A vacuum cleaner comprising:
   a head assembly including a fan cover and an electric motor mount fasteningly and hermetically connected to each other, the electric motor mount including a side wall and a bottom wall;
   a filter assembly, the filter assembly and the electric motor mount being disposed on a same side of the fan cover, the filter assembly being disposed at an outer periphery of the side wall and the bottom wall;
   a hermetic gap defined between a free end of the filter assembly and the head assembly, a hermetic member being disposed in the hermetic gap; and
   a spiral fitting structure disposed between the free end of the filter assembly and the head assembly, the spiral fitting structure being screwed to tighten and narrow the hermetic gap,
   wherein the spiral fitting structure includes a first thread disposed in a circumferential direction on one of the free end of the filter assembly and the head assembly, and a second thread corresponding to and complementary to the position of the first thread on another of the free end of the filter assembly and the head assembly, the first thread and the second thread defining a fixing path between the free end of the filter assembly and the head assembly, the hermetic gap being gradually reduced when the first thread and the second thread are tightened,
   wherein the vacuum cleaner further includes an unclean air inlet, a clean air outlet, and an air passage disposed between the unclean air inlet and the clean air outlet, the filter assembly including a first filter and a second filter, a vacuum generator being disposed in the air passage, and the first filter being disposed upstream of the vacuum generator and the second filter being disposed upstream of the first filter, the vacuum cleaner further including a status sensor sensing a first status and a second status, in the first status, the first filter and the second filter cooperate with each other to trigger the status sensor, in the second status, the first filter and the second filter do not cooperate with each other, and the status sensor is not triggered, and wherein the filter assembly further includes a filter bracket, an outer periphery of the fan cover defining a through hole, the status sensor being disposed corresponding to the through hole, a first end of the first filter being non-detachably and hermetically connected to the filter bracket, an upstream side of a second end of the first filter including a first protrusion, and an outer periphery of the filter bracket including a second installation portion, in the first status, the second end of the first filter is hermetically connected to the fan cover, a first end of the second filter is detachably and hermetically connected to the second installation portion, and a second end of the second filter is inserted into the through hole to trigger the status sensor.

2. The vacuum cleaner in accordance with claim 1, wherein the thickness of the hermetic member in a tightening direction of screwing is not less than a minimum width between the free end of the filter assembly and the head assembly.

3. The vacuum cleaner in accordance with claim 1, wherein the first thread is an external thread disposed outside the free end of the filter assembly, the head assembly including a first threaded wall extending toward the bottom wall, the second thread including an internal thread disposed inside the first threaded wall.

4. The vacuum cleaner in accordance with claim 1, wherein the first thread is an internal thread disposed inside the free end of the filter assembly, and the second thread is an external thread disposed on an outside surface of the side wall.

5. The vacuum cleaner in accordance with claim 4, wherein a second threaded wall is provided at an end of the side wall away from the bottom wall, and the second thread is an external thread disposed on n outer surface of the second threaded wall.

6. The vacuum cleaner in accordance with claim 5, wherein the second threaded wall protrudes from the side wall in a radial direction of the electric motor mount.

7. The vacuum cleaner in accordance with claim 1, wherein a side of the free end of the filter assembly facing toward the head assembly includes a second protrusion.

8. The vacuum cleaner in accordance with claim 1, wherein the free end of the filter assembly includes an end cover hermetically connected to the filter assembly, the first thread being disposed on one of the n inner side or an outer side of the the end cover, a side of the end cover facing toward the head assembly including a second protrusion.

9. The vacuum cleaner in accordance with claim 1, further including an elastic arm, one end of the elastic arm including a pressing head, another end of the elastic arm being connected to an inner wall of the through hole.

10. The vacuum cleaner in accordance with claim 1, wherein the second end of the first filter includes an end cover, an upstream side of the end cover includes a first protrusion.

11. The vacuum cleaner in accordance with claim 1, wherein the second installation portion is configured as a groove defining at least one dust hole at a bottom.

12. The vacuum cleaner in accordance with claim 11, wherein two adjacent dust holes are defined in the groove, an inclined surface being disposed between the two adjacent dust holes, the inclined surface being one of inclined downward from a point between the two adjacent dust holes to both of the two adjacent dust holes, or the inclined surface is inclined downward from one of the two adjacent dust holes to another of the two adjacent dust holes.

13. The vacuum cleaner in accordance with claim 11, wherein the at least one dust hole houses a springy member.

14. The vacuum cleaner in accordance with claim 1, wherein the fan cover further including a linkage portion having an abutment member disposed at an upstream side of the fan cover and a triggering member hinged to a middle portion of the abutment member, the triggering member being inside the through hole and moving along a central axis thereof, in the first status, the first filter presses against a first end of the abutment member, the second filter presses against a second end of the abutment member, and the abutment member causes the triggering member to trigger the status sensor.

15. The vacuum cleaner in accordance with claim 14, wherein one of the through hole or the triggering member includes at least one third protrusion, and the other defines at least one sliding groove that cooperates with the at least one third protrusion.

16. A method for assembling the vacuum cleaner as defined in claim 1, the method comprising the following steps:

covering the filter assembly from an end away from the head assembly to a periphery of the electric motor mount to make the spiral fitting structure to fit together; and rotating the filter assembly to tighten the spiral fitting structure to make the free end of the filter assembly and the head assembly press against the hermetic member.

* * * * *